United States Patent
Yamamoto et al.

(10) Patent No.: US 6,846,265 B2
(45) Date of Patent: Jan. 25, 2005

(54) HYBRID VEHICLE

(75) Inventors: Kazuhisa Yamamoto, Utsunomiya (JP); Kazuhiko Kitano, Kawachi-gun (JP); Yutaka Ishikawa, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/395,105

(22) Filed: Mar. 25, 2003

(65) Prior Publication Data

US 2003/0186778 A1 Oct. 2, 2003

(30) Foreign Application Priority Data

Mar. 27, 2002 (JP) .................................... P2002-088198

(51) Int. Cl.[7] .............................................. B60K 1/02
(52) U.S. Cl. ......................................... 477/3; 477/180
(58) Field of Search .......................... 477/35, 174–175, 477/180; 180/65.4

(56) References Cited

U.S. PATENT DOCUMENTS

| | | | | |
|---|---|---|---|---|
| 6,042,507 A | * | 3/2000 | Genise et al. ............... | 477/181 |
| 6,317,665 B1 | * | 11/2001 | Tabata et al. ................ | 701/22 |
| 6,338,696 B1 | * | 1/2002 | Sakakibara et al. ......... | 477/175 |
| 6,629,024 B2 | * | 9/2003 | Tabata et al. ................ | 701/22 |
| 2002/0006848 A1 | * | 1/2002 | Tabata ......................... | 477/32 |

FOREIGN PATENT DOCUMENTS

| | | |
|---|---|---|
| JP | 07-250404 | 9/1995 |
| JP | 09-009415 | 1/1997 |
| JP | 10-184896 | 7/1998 |
| JP | 2000-152407 | 5/2000 |
| JP | 2000-193083 | 7/2000 |
| JP | 2001-099306 | 4/2001 |
| JP | 2001-271923 | 5/2001 |

* cited by examiner

*Primary Examiner*—Roger Pang
(74) *Attorney, Agent, or Firm*—Arent Fox PLLC

(57) ABSTRACT

In a hybrid vehicle, power is transmitted via a torque converter provided with a lock-up clutch, and a force input through wheels during deceleration is transmitted to the motor via the torque converter so that a regenerative operation may be carried out by the motor to convert deceleration energy into regenerative energy. The hybrid vehicle includes a throttle opening degree detection unit which detects an opening degree of the throttle; a lock-up clutch engaging state determination unit which determines an engaged state of the lock-up clutch; and a lock-up clutch engagement control unit which controls an engagement of the lock-up clutch. The lock-up clutch engagement control unit, if the throttle opening degree detection unit detects a completely closed state of the throttle, controls the lock-up clutch so as to be engaged regardless of an engaged state of the lock-up clutch determined by the lock-up clutch engaging state determination unit.

9 Claims, 6 Drawing Sheets

HYBRID VEHICLE

BACKGROUND OF THE INVENTION

1. Field of the Invention

The present invention relates to a hybrid vehicle. More specifically, the present invention relates to a hybrid vehicle which uses an engine and a motor capable of generating power as a source of power, and includes a torque converter provided with a lock-up clutch and a transmission between the source of power and an output shaft.

2. Description of Related Art

Recently, hybrid vehicles including an engine and a motor capable of generating power as a source of power have been developed to conserve fuel for driving the engine and to decrease exhausted gases generated by combusting the fuel.

In this type of hybrid vehicle, power input from vehicle's wheels during deceleration of the vehicle is generally transmitted to the motor, and a regenerative operation is performed by the motor to convert the deceleration energy into regenerative energy so that the energy may be stored in a battery as electrical energy. Hereinafter, the regenerative operation carried out by the motor during the deceleration of the vehicle is called regenerative braking.

Also, as described in Japanese Unexamined Patent Application, First Publication No. Hei 9-9415, for example, some of the above-mentioned type of hybrid vehicle include a torque converter and a multistage automated transmission between the source of power and driving wheels.

In such hybrid vehicles, a gear change point at which the gear of the multistage automated transmission is determined, is shifted to a direction increasing the high speed gear region during the regenerative braking so that the revolution rate of the engine is set to be smaller and the energy consumed by the engine brake decreases, thereby enhancing the regenerative efficiency by increasing the regenerative energy to increase the regenerative electric power generated.

Moreover, in the above-mentioned hybrid vehicle, the lock-up clutch is disengaged during the regenerative braking so that the resistance of the engine decreases and the regenerative power further increases.

However, there are problems for a hybrid vehicle having a structure in which the input side of the motor is connected to the output side of the engine, the input side of the torque converter provided with the lock-up clutch is connected to the output side of the motor, and the driving wheels are connected to the output side of the torque converter, that the regenerative efficiency decreases and the regenerative power is reduced if the regenerative braking is carried out when the lock-up clutch is disengaged since the torque (i.e., regenerative torque) at which the regenerative operation is carried out by the motor depends on, or is restricted by, the capacity of the transmitted torque from the torque converter.

SUMMARY OF THE INVENTION

Accordingly, an object of the present invention is to provide a hybrid vehicle in which the regenerative operation is effectively carried out by engaging the lock-up clutch during the regenerative braking so as to increase the regenerative power.

In order to achieve the above object, the present invention provides a hybrid vehicle (for instance, a hybrid vehicle 1 shown in FIG. 1) including an engine (for instance, an engine 2 shown in FIG. 1) and a motor capable of generating power (for instance, a motor generator 3 shown in FIG. 1) as a source of power, in which power from at least one of the engine and the motor is transmitted to an output shaft (for instance, an output shaft 7 shown in FIG. 1) via a torque converter (for instance, a torque converter 5 shown in FIG. 1) provided with a lock-up clutch (for instance, a lock-up clutch 4 shown in FIG. 1) and a transmission (for instance, a transmission 6 shown in FIG. 1) to be used as a driving force for the vehicle, and a force input through wheels (for instance, wheels W shown in FIG. 1) during a deceleration mode of the vehicle is transmitted to the motor via the torque converter and the transmission so that a regenerative operation is carried out by the motor to convert deceleration energy into regenerative energy, the hybrid vehicle comprising: a throttle opening degree detection unit (for instance, a throttle position sensor 21 shown in FIG. 1) which detects an opening degree of the throttle; a lock-up clutch engaging state determination unit (for instance, an L/C engaging flag shown in FIGS. 5 and 6) which determines an engaged state of the lock-up clutch; and a lock-up clutch engagement control unit (for instance, an oil-hydraulic circuit 12 and ECU 13 shown in FIG. 1) which controls an engagement and non-engagement of the lock-up clutch, wherein the lock-up clutch engagement control unit, if the throttle opening degree detection unit detects a completely closing state of the throttle, controls the lock-up clutch so as to be engaged regardless of the engaged state of the lock-up clutch determined by the lock-up clutch engaging state determination unit.

According to the hybrid vehicle having the above-mentioned configuration, when a regenerative operation is carried out by the motor during deceleration of the vehicle, it becomes possible to perform the regenerative operation with an engaged state of the lock-up clutch from the initial stage of deceleration. Accordingly, restriction in the regenerative torque associated with having a torque converter may be eliminated, and as a result, the deceleration energy may be efficiently converted into regenerative energy.

In accordance with another aspect of the present invention, in the above hybrid vehicle, the lock-up clutch engagement control unit is capable of controlling the lock-up clutch so as to be engaged if the lock-up clutch engaging state determination unit determines that the lock-up clutch is in a non-engagement state.

According to the above hybrid vehicle, it becomes possible to change the state of the lock-up clutch from non-engagement to engagement if the lock-up clutch is not engaged when the throttle is completely closed. Accordingly, a regenerative operation may be carried out with an engaged state of the lock-up clutch from the initial stage of deceleration. Thus, restriction in the regenerative torque associated with having a torque converter may be eliminated, and as a result, the deceleration energy may be efficiently converted into regenerative energy.

In yet another aspect of the present invention, the above hybrid vehicle further comprising: a transmission input shaft revolution rate detection unit (for instance, a transmission revolution rate sensor 28 shown in FIG. 1) which detects a revolution rate of an input shaft of the transmission; a motor revolution rate detection unit (for instance, an engine revolution rate sensor 26 shown in FIG. 1) which detects a revolution rate of the motor; and a motor control unit (for instance, a step S109 shown in FIG. 3) which drives the motor based on a revolution rate as a target value, wherein the motor control unit, when the throttle opening degree detection unit detects a completely closing state of the throttle, carries out a synchronizing control in which the revolution rate of the motor is controlled so as to synchronize with the revolution rate of the input shaft of the transmission, which is detected by the transmission input shaft revolution rate detection unit.

According to the above hybrid vehicle, it becomes possible to firmly engage the lock-up clutch which has not been engaged.

In yet another aspect of the present invention, the above hybrid vehicle further comprises: a lock-up clutch revolution rate synchronization determination unit (for instance, a step S107 shown in FIG. 3) which determines synchronization of the revolution rate of the motor with the revolution rate of the input shaft of the transmission, wherein the motor control unit terminates the synchronizing control when it is determined by the lock-up clutch revolution rate synchronization determination unit that synchronization is achieved.

According to the above hybrid vehicle, it becomes possible to terminate the synchronizing control by the motor control unit when it is determined by the lock-up clutch revolution rate synchronization determination unit that the revolution rate of the motor and the revolution rate of the input shaft of the transmission are synchronized.

In yet another aspect of the present invention, in the above hybrid vehicle, the lock-up clutch revolution rate synchronization determination unit determines whether or not synchronization is achieved based on whether a value (for instance, a difference ΔN in revolution rate shown in FIG. 3) satisfies a predetermined condition, the value being obtained by comparing the revolution rate of the input shaft of the transmission, which is detected by the transmission input shaft revolution rate detection unit, with the revolution rate of the motor, which is detected by the motor revolution rate detection unit.

According to the above hybrid vehicle, it becomes possible to make a reliable determination whether or not the revolution rate of the motor and the revolution rate of the input shaft of the transmission are synchronized. Note that the value may be a difference between the revolution rate of the motor and the revolution rate of the input shaft of the transmission, or the ratio of the revolution rate of the two.

In yet another aspect of the present invention, in the above hybrid vehicle, the lock-up clutch revolution rate synchronization determination unit determines that synchronization is achieved when a predetermined time has been elapsed since the synchronizing control by the motor control unit is started.

According to the above hybrid vehicle, it becomes possible to avoid a needlessly lengthy synchronizing control by the motor control unit.

In yet another aspect of the present invention, the above hybrid vehicle further comprises: a regeneration allowance determination unit (for instance, a step S100 shown in FIG. 2) which determines allowance and non-allowance of the regenerative operation by the motor, wherein the regeneration allowance determination unit allows the regenerative operation when it is determined by the lock-up clutch revolution rate synchronization determination unit that synchronization is achieved.

According to the above hybrid vehicle, it becomes possible to quickly carry out a regenerative operation after it is determined by the lock-up clutch revolution rate synchronization determination unit that the revolution rate of the motor and the revolution rate of the input shaft of the transmission are synchronized.

In yet another aspect of the present invention, in the above hybrid vehicle, the motor control unit, when the throttle opening degree detection unit detects a completely closed state of the throttle, terminates the synchronizing control if the lock-up clutch engaging state determination unit determines that the lock-up clutch is engaged.

According to the above hybrid vehicle, it becomes possible to terminate the synchronizing control since the synchronizing control by the motor control unit may not be necessary when the lock-up clutch is engaged.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Hereinafter, an embodiment of the hybrid vehicle according to the present invention will be explained with reference to FIGS. 1 through 7.

Figure 1:
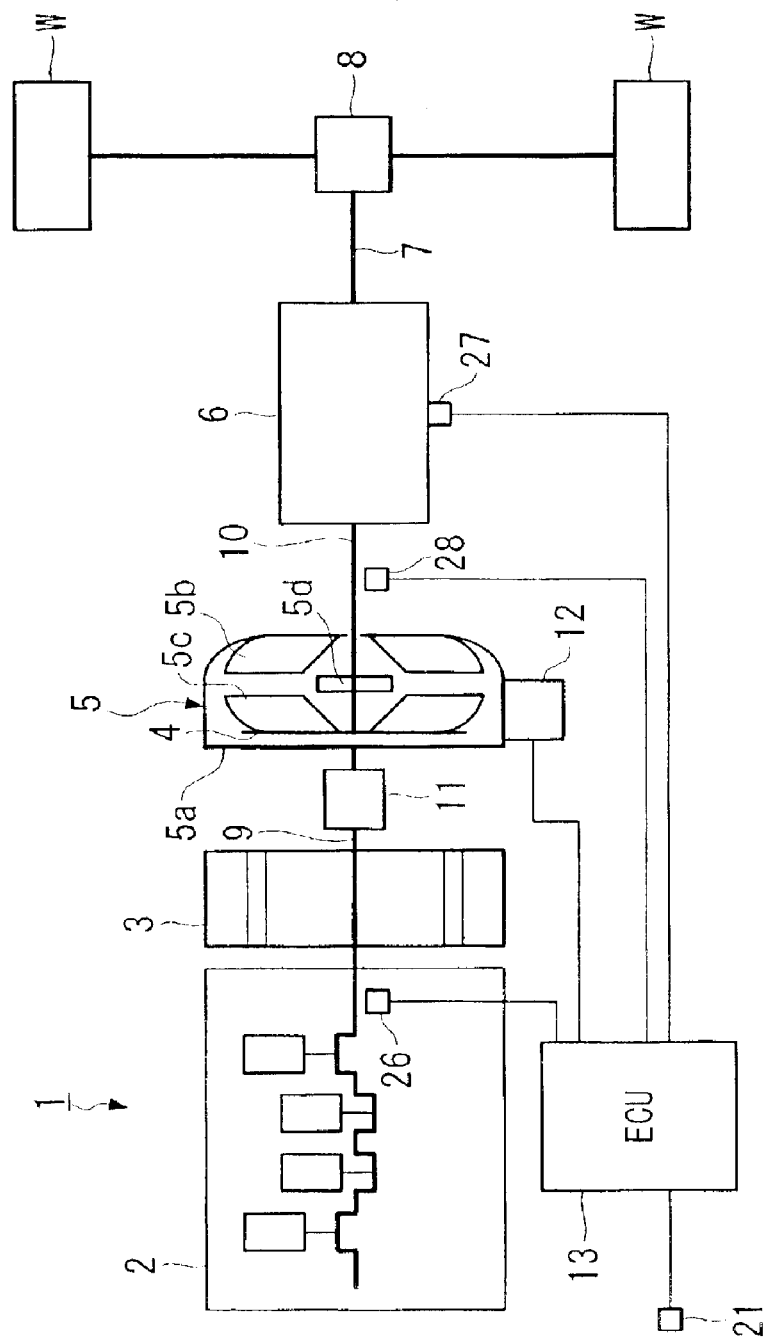
FIG. 1 is a schematic diagram showing a structure of a hybrid vehicle according to an embodiment of the present invention.

FIG. 1 is a schematic diagram showing the structure of a hybrid vehicle according to the embodiment of the present invention.

In a hybrid vehicle 1 shown in FIG. 1, power from at least one of an engine 2 and a motor capable of generating power (hereinafter also called a motor generator) 3, which are connected in series, is transmitted to an output shaft 7 via a torque converter 5 provided with a lock-up clutch 4 and a transmission 6, and is then transmitted to driving wheels W and W of the vehicle from the output shaft 7 via a differential gear 8. A rotary shaft 9 of the motor generator 3 is connected to the input side of the torque converter 5, and an input shaft 10 of the transmission 6 is connected to the output side of the torque converter 5. Also, the hybrid vehicle 1 includes a mechanical oil pump 11 which generates an oil pressure for driving and controlling the torque converter 5 and the transmission 6, an oil-hydraulic circuit 12 that includes an electric oil pump for controlling the actuation oil pressure for the lock-up clutch 4, etc., and an electrical control unit (ECU) 13.

The torque converter 5 transmits the torque via fluid, and it includes a front cover 5a, a pump impellor 5b, a turbine runner 5c, and a stator 5d. The front cover 5a is coupled with the rotary shaft 9 of the motor generator 3, and the pump impellor 5b is provided integral with the front cover 5a. The turbine runner 5c is disposed between the front cover 5a and the pump impellor 5b so as to oppose the pump impellor 5b. The stator 5d is disposed between the pump impellor 5b and the turbine runner 5c.

Also, the lock-up clutch 4, which is disposed so as to oppose the inner surface of the front cover 5a and can be engaged with the front cover 5a, is provided between the front cover 5a and the turbine runner 5c.

Moreover, hydraulic fluid is sealed in a container formed by the front cover 5a and the pump impellor 5b.

The lock-up clutch 4 is formed so as to be capable of engaging/disengaging with the front cover 5a. When the pump impellor 5b rotates together with the front cover 5a in a state in which the engagement of the lock-up clutch is released (i.e., a non-engaging state), helical flow of the hydraulic fluid is generated and this helical flow of the hydraulic fluid acts on the turbine runner 5c to generate a rotary driving force. Accordingly, torque is transmitted to the output shaft of the torque converter 5, i.e., the input shaft 10 of the transmission 6, via the hydraulic fluid. Note that the term "non-engaging state" of the lock-up clutch 4 includes a half engagement as well as a total release of the clutch.

Also, when the lock-up clutch 4 enters the engaging state thereof, the rotary driving force is directly transmitted to the input shaft 10 of the transmission 6, with no involvement of the hydraulic fluid, from the front cover 5a to the turbine runner 5c.

Note that the state of the lock-up clutch 4 may be varied between the engagement state and disengagement state thereof by controlling the actuation oil pressure, and the rotary driving force transmitted from the front cover 5a to the turbine runner 5c via the lock-up clutch 4 may be arbitrarily changed. Also, the actuation oil pressure of the lock-up clutch 4 may be controlled by the oil-hydraulic circuit 12 based on commands from the ECU 13.

The transmission 6 may be any type which is conventionally known in the field, and hence the explanation thereof will be omitted. Note that the transmission 6 includes a gear train (not shown in FIG. 1) which is provided between the input shaft 10 and the output shaft 7 of the transmission 6 and is capable of changing the gear ratio, and an oil-hydraulic circuit (not shown in FIG. 1) for operating a clutch (also not shown in FIG. 1) which is used for changing the power transmitting gear of the gear train. The gear changing operation by the transmission 6 is performed by the ECU 13, which controls the above-mentioned oil-hydraulic circuit and operates the clutch, in accordance with, for example, the sifting operation made by a driver, or the driving state of the vehicle.

Also, the oil pump 11 may be disposed between the engine 2 and the motor generator 3, both of which are connected in series, and the torque converter 5. The oil pump 11 may be operated to be synchronized with the input revolution rate of the torque converter 5.

Moreover, the above-mentioned electric oil pump (not shown in FIG. 1) of the oil-hydraulic circuit 12 which controls the actuation oil pressure of the lock-up clutch 4 is driven by the electric power supplied form a battery device (not shown in FIG. 1).

Furthermore, as will be described later, the ECU 13 controls the lock-up clutch 4 so as to enter the engaged state thereof during the regenerative braking regardless of the state, i.e., the engaged state or the non-engaged state, of the lock-up clutch 4 at that time, and the ECU 13 also controls so that the input and output revolution rate of the lock-up clutch 4 synchronize when the lock-up clutch 4 is engaged.

For this reason, an output signal from a throttle position sensor (i.e., a throttle opening degree detection unit) 21 which detects the opening degree of a throttle valve (not shown in FIG. 1) of the engine 2, an output signal from an engine revolution rate sensor (i.e., a motor revolution rate detection unit) 26 which detects the revolution rate of the engine 2 (i.e., the revolution rate of the rotary shaft 9 of the motor generator 3), an output signal from a gear change detection unit 27 which detects whether or not the transmission 6 is changing the gear, and an output signal from a transmission revolution rate sensor (i.e., a transmission's input shaft revolution rate detection unit) 28 which detect the revolution rate of the input shaft 10 of the transmission 6 (i.e., the revolution rate of the output shaft of the torque converter 5) are input to the ECU 13. Note that the gear change detection unit 27 outputs an output signal which sets "1" for a gear change flag when the transmission 6 is changing the gear, and it outputs an output signal which sets "0" for a gear change flag when the transmission 6 is not changing the gear.

Next, the regenerative braking of the hybrid vehicle 1 having the above-explained configuration will be explained.

In the hybrid vehicle 1, when the throttle valve is completely closed by the driver's intention, the ECU 13 controls the lock-up clutch 4 to enter the engaged state regardless of the state (i.e., the engaged stage or the non-engaged state) of the lock-up clutch 4 just before the completely closing operation of the throttle valve.

Note that although the revolution rate of the engine 2 is reduced by upshifting the gear of the transmission 6 when the operation of completely closing the throttle valve is performed so that the energy consumed by the engine braking is kept low and the regenerative energy increases, shock is caused if this operation is carried out when the lock-up clutch 4 is in the engaged state. Accordingly, in order to prevent the generation of shock, the lock-up clutch 4 is controlled to be in its non-engaged state during the period when the upshifting operation associated with the completely closing operation of the throttle valve is performed, and after the completion of the upshifting operation, the lock-up clutch 4 is engaged.

In this case, since the revolution rate of the engine 2 decreases due to fuel cut, etc., a significantly large difference may be caused between the revolution rate of the front cover 5a of the torque converter 5 (in other words, the revolution rate of the motor generator 3, or the revolution rate of the engine 2) and the revolution rate of the lock-up clutch 4 (in other words, the revolution rate of the input shaft 10 of the transmission 6) once the lock-up clutch 4 is disengaged, and if such a large difference is present, it is difficult to reengage the lock-up clutch 4. Accordingly, in this embodiment, when the lock-up clutch 4 is engaged after the completion of the upshifting operation in the above-mentioned non-engaged state of the lock-up clutch 4, the revolution rate N2 of the motor generator 3 is synchronized with the revolution rate N1 of the transmission's input shaft 10 by controlling the revolution rate of the motor generator 3 if the revolution rate N2 of the motor generator 3 is not synchronized with the revolution rate N1 of the transmission's input shaft 10 in order to engage the lock-up clutch 4.

Also, in this embodiment, when the gear of the transmission 6 is changed during the regenerative braking, the lock-up clutch 4 is disengaged during the gear change operation so that shock is not caused, and the lock-up clutch 4 is reengaged after the completion of the gear change operation. When the lock-up clutch 4 is reengaged, the revolution rate N2 of the motor generator 3 is synchronized with the revolution rate N1 of the transmission's input shaft 10 by controlling the revolution rate of the motor generator 3 if the revolution rate N2 of the motor generator 3 is not synchronized with the revolution rate N1 of the transmission's input shaft 10 in order to engage the lock-up clutch 4.

Figure 3:
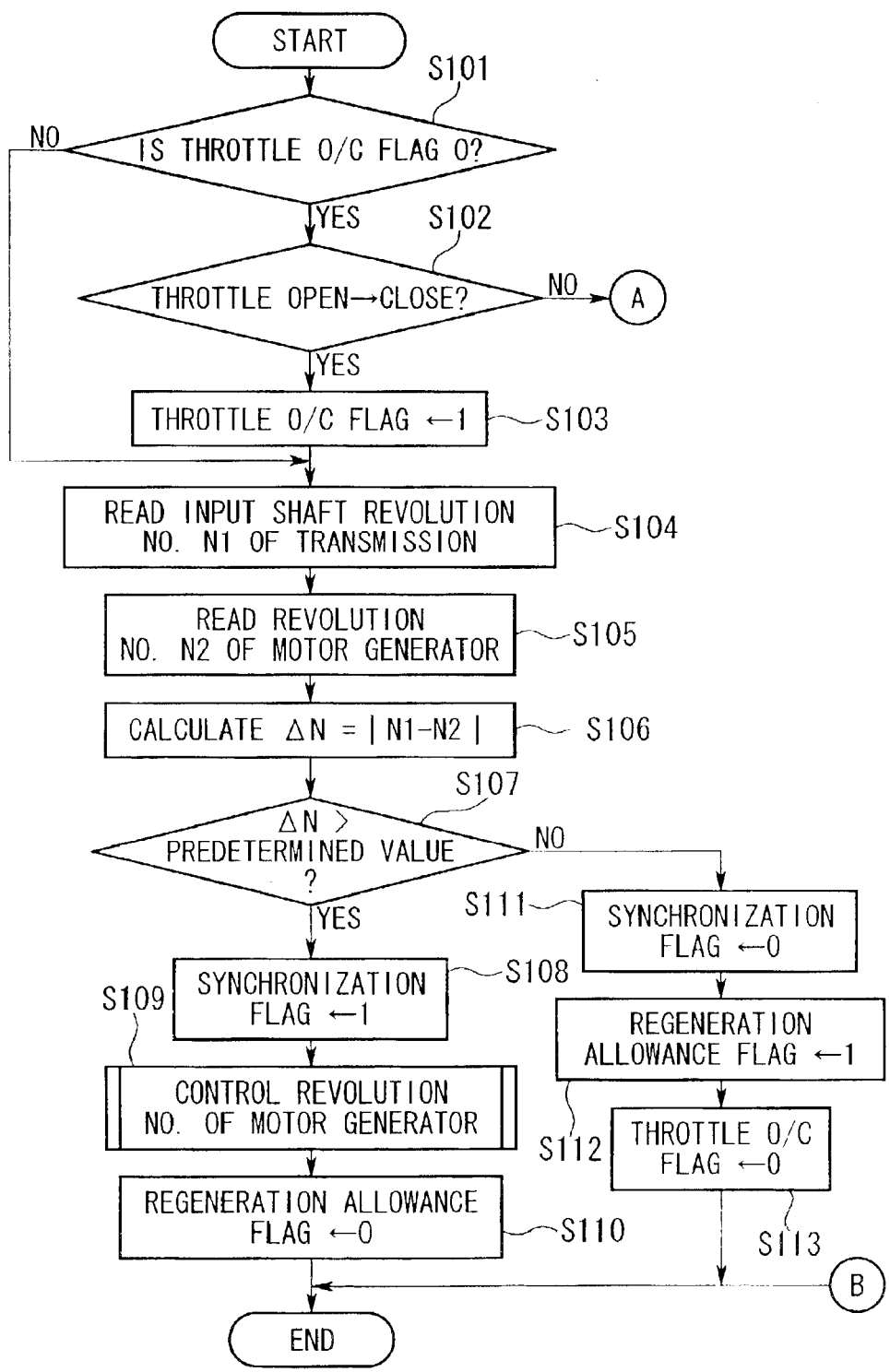
FIG. 3 is a flowchart (part one) of a regeneration allowance determination process used in the embodiment of the present invention.
Figure 4:
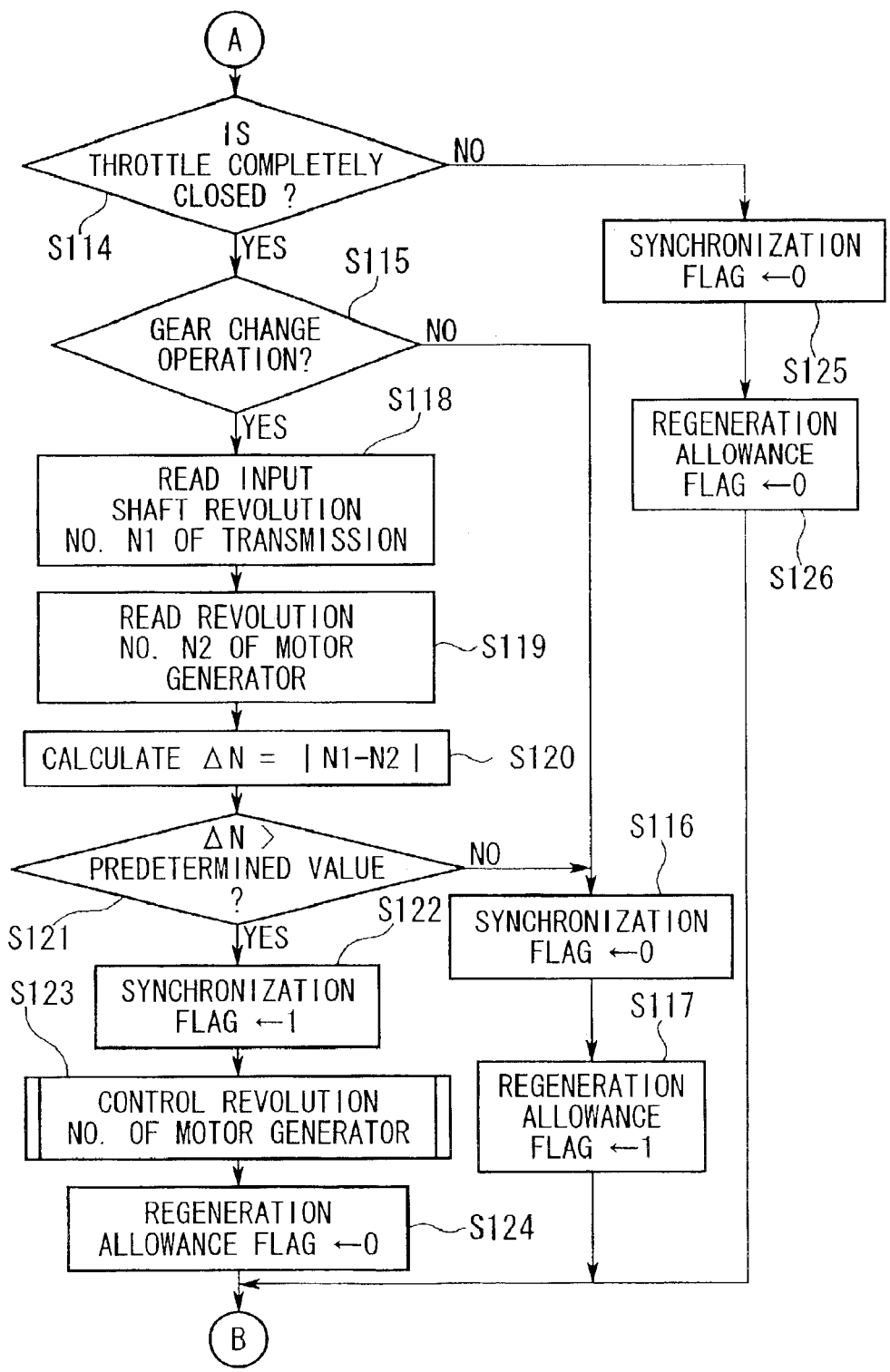
FIG. 4 is a flowchart (part two) of the regeneration allowance determination process used in the embodiment of the present invention.

Next, the above-mentioned operations will be described in more detail with reference to flowcharts shown in FIGS. 2–4, and a time chart shown in FIG. 5.

First, the regenerative braking will be explained with reference to the time chart shown in FIG. 5.

Figure 5:
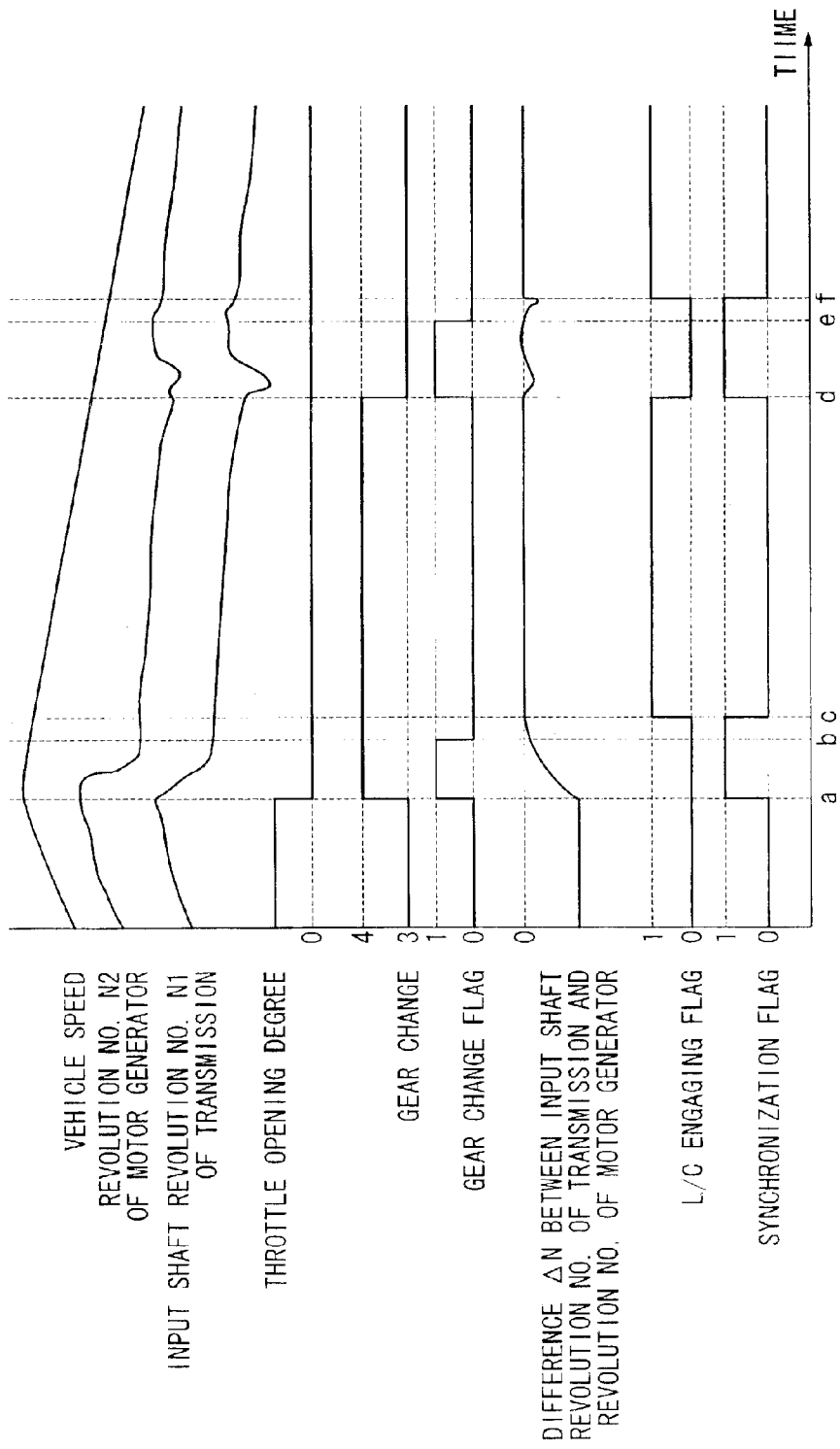
FIG. 5 is a time chart for explaining processes when the regenerative control is performed according to the embodiment of the present invention.

Note that the time chart shown in FIG. 5 indicates an example in which the lock-up clutch 4 is in the non-engaged state just before the completely closing operation of the throttle valve.

Prior to time "a", the vehicle is in an acceleration state, and the throttle valve is open. Also, the lock-up clutch 4 is in its non-engaged state at that time, and a lock-up clutch engaging flag (hereinafter abbreviated as a L/C engaging flag) for determining the engaged state of the lock-up clutch 4 is "0". Moreover, since the lock-up clutch 4 is in its non-engaged state, a difference ΔN in the revolution rate is present between the revolution rate N1 of the transmission's input shaft and the revolution rate N2 of the motor generator. Note that a revolution synchronization flag, which indicates weather the control operation for the revolution rate of the motor generator 3 is carried out or not, is "0" since the revolution rate of the motor generator 3 is not controlled.

At time "a", when the throttle valve is completely closed intentionally by the driver, the transmission 6 carries out an upshifting operation (in this example, the gear is changed from level 3 to 4) in accordance with the gear change map, and the gear change detection unit 27 detects a gear change operation by the transmission 6 to assign "1" to the gear change flag. The reason for carrying out the upshifting operation is, as explained above, to lower the revolution rate of the engine 2 to reduce the energy consumed by the engine brake so that the regenerative energy increases. The upshifting operation is completed at time "b". In this case, the gear change flag is "1" during the time "a" to "b", and is "0" at the time "b". Also, the lock-up clutch 4 is controlled to be in the non-engaged state by the oil-hydraulic circuit 12 during the upshifting operation in order to prevent the generation of shock.

Also, if there is a difference between the revolution rate N1 of the transmission's input shaft and the revolution rate N2 of the motor generator at time "a", "1" is assigned to the synchronization flag to allow controlling the revolution rate of the motor generator 3. In this manner, the operation for controlling the revolution rate of the motor generator 3 is carried out using the revolution rate N1 of the transmission's input shaft as a target value. Note that in the example shown in FIG. 5, the revolution rate of the motor generator 3 is controlled to be increased during the controlling operation for the revolution rate of the motor generator 3, and the revolution rate N1 of the transmission's input shaft and the revolution rate N2 of the motor generator are almost synchronized at time "c". When it is determined that the revolution rate N1 of the transmission's input shaft and the revolution rate N2 of the motor generator are synchronized, the synchronization flag is set to be "0", and the operation for controlling the revolution rate of the motor generator 3 is terminated. Note that the revolution rate N1 of the transmission's input shaft and the revolution rate N2 of the motor generator are determined to be synchronized when the difference ΔN between the revolution rate N1 of the transmission's input shaft and the revolution rate N2 of the motor generator is within a predetermined range, and are determined to be not synchronized when the difference ΔN is not within the predetermined range.

The lock-up clutch 4 is engaged when the operation for controlling the revolution rate of the motor generator 3 is completed, and the lock-up clutch 4 is firmly engaged without generating a shock. Accordingly, the L/C engaging flag becomes "1" at time "c". Then, since the L/C engaging flag is "1" and the synchronization flag is "0", the regenerative braking is allowed.

As a result, the regenerative braking is performed after time "c" in a state in which the lock-up clutch 4 is engaged. In this case, since the lock-up clutch 4 is engaged, the power input from the driving wheel W is effectively transmitted to the motor generator 3. The deceleration energy is converted into a regenerative energy by the regenerative operation of the motor generator 3, and the energy is stored in a battery, which is not shown in the figure, as electrical energy. Accordingly, the regenerative operation may be performed in an engaged state of the lock-up clutch 4 from the initial stage of deceleration, and hence, the restriction in the regenerative torque associated with having a torque converter may be eliminated. Hence, the deceleration energy may be efficiently converted into a regenerative energy. As a result, the power generated by the regenerative operation can be increased, the hybrid running region may be enlarged, and the gas mileage is improved.

Note that in this embodiment, the lock-up clutch engaging state determination unit which determines the engaged stage of the lock-up clutch 4 is realized by the above-mentioned L/C engaging flag, and the lock-up clutch engaging controlling unit which controls the engagement and non-engagement of the lock-up clutch 4 is realized by the ECU 13 and the oil-hydraulic circuit 12.

Also, when the transmission 6 is downshifted (from level 4 to 3 in this embodiment) in accordance with the gear change map during the regenerative braking at time "d", the gear change detection unit 27 detects the gear change of the transmission 6, and assigns "1" to the gear change flag. Then, the downshifting operation is terminated at time "e". In this case, the gear shift flag is "1" during the time period of "d" to "e", and "0" is assigned to the gear change flag at time "e". Moreover, the lock-up clutch 4 is controlled by the oil-hydraulic circuit 12 to be in a non-engaged state during the downshift operation in order to prevent the generation of shock.

Furthermore, if there is a difference between the revolution rate N1 of the transmission's input shaft and the revolution rate N2 of the motor generator at time "d", "1" is assigned to the. synchronization flag and the operation for controlling the revolution rate of the motor generator is allowed. In this manner, the operation for controlling the revolution rate of the motor generator 3 is carried out in the same manner as explained above, and the revolution rate N1 of the transmission's input shaft and the revolution rate N2 of the motor generator are almost synchronized at time "f". Then, if it is determined that the revolution rate N1 of the transmission's input shaft and the revolution rate N2 of the motor generator are synchronized, "0" is assigned to the synchronization, flag and the operation for controlling the revolution rate of the motor generator 3 is completed.

The lock-up clutch 4 is engaged when the operation for controlling the revolution rate of the motor generator 3 is completed, and the lock-up clutch 4 is firmly engaged without generating a shock. Accordingly, the L/C engaging flag becomes "1" at time "f". Then, since the L/C engaging flag is "1" and the synchronization flag is "0", the regenerative braking is allowed.

As a result, similar to the time period between "c" and "d", the regenerative braking is performed after time "f" in a state the lock-up clutch 4 is engaged. Accordingly, the regenerative operation may be performed in an engaged state of the lock-up clutch 4, and hence, the restriction in the regenerative torque associated with having a torque converter may be eliminated. Hence, the deceleration energy may be converted into a regenerative energy in an extremely efficient manner. As a result, the power generated by the regenerative operation can be increased, the hybrid running region may be enlarged, and the gas mileage is improved.

Next, the regenerative control according to the embodiment of the present invention will be explained with reference to flowcharts shown in FIGS. 2–4.

Figure 2:
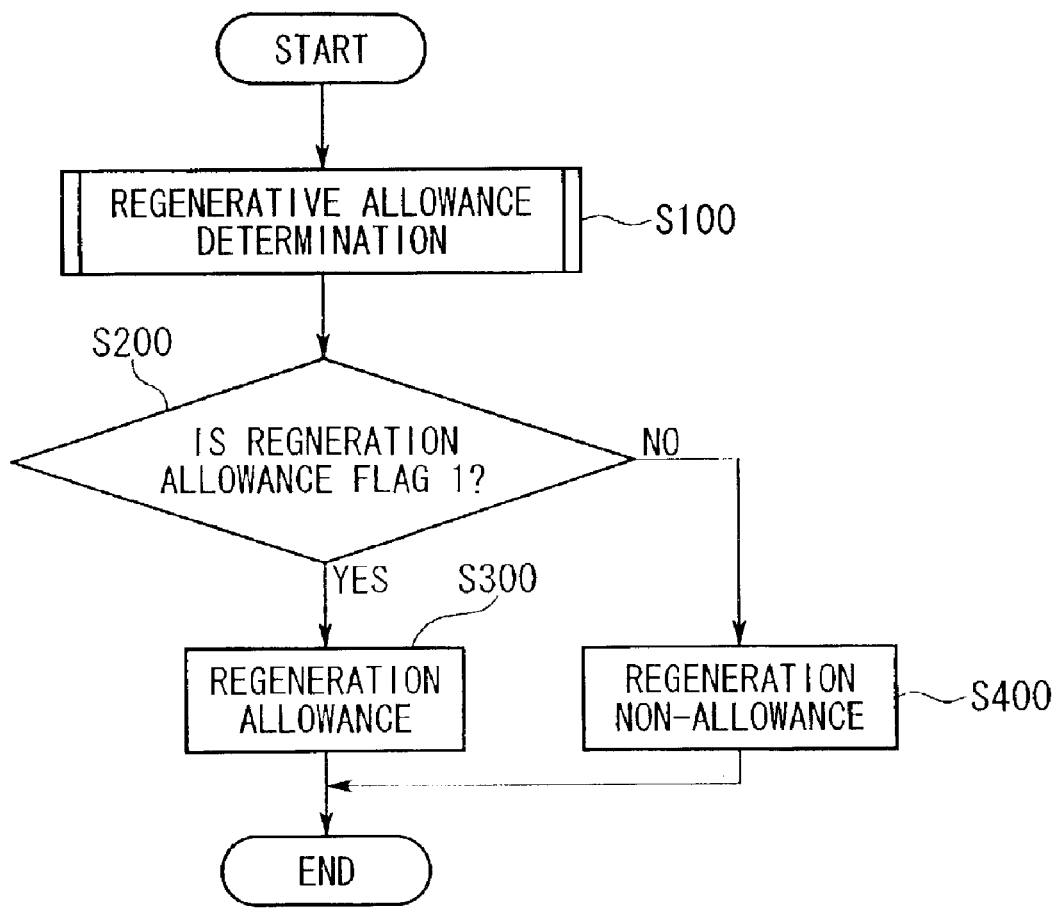
FIG. 2 is a flowchart of a regenerative control used in the embodiment of the present invention.

The flowchart shown in FIG. 2 indicates a regenerative control routine, and the control routine is carried out by the ECU 13 with constant time intervals.

First, in step S100, a regeneration allowance determination process is performed, and then, in step S200, it is determined whether the regeneration allowance flag is "1" or not.

If the result of the determination in step S200 is "YES" (i.e., the regeneration allowance flag is "1"), then the process proceeds to step S300, and the execution of the main routine is temporary terminated by allowing the regenerative operation. In this manner, the regenerative operation by the motor generator 3 is quickly performed, and the loss of the regenerative energy may be prevented.

On the other hand, if the determination result in step S200 is "NO" (i.e., the regeneration allowance flag is "0"), the process proceeds to step S400, and the execution of the main routine is temporary terminated by not allowing the regenerative operation. Accordingly, the regenerative operation of the motor generator 3 is not carried out.

Here, the regeneration allowance determination process in step S100 will be explained with reference to FIGS. 3 and 4.

First, in step S101, it is determined if the throttle open/close flag is "0" or not. If the determination result in step S101 is "YES" (i.e., the throttle open/close flag is "0"), the process proceeds to step S102, and if the determination result is "NO" (i.e., the throttle open/close flag is "1"), the process proceeds to step S104.

In step S102, the throttle position signal detected by the throttle position sensor 21 is read, and it is determined if the state of the throttle valve has been changed from "open" to "completely closed". That is, if it was determined that the throttle valve was open when the routine was previously performed, and if it is determined that the throttle valve is completely closed when the routine is carried out this time, it is determined that the state of the throttle valve has been changed from "open" to "completely closed". Also, if the above-mentioned throttle position signal is equal to or less than a predetermined value, it is determined that the throttle valve is completely closed, and if the signal exceeds the predetermined value, it is determined that the throttle valve is open.

If the determination result in step S102 is "YES" (i.e., the state of the throttle valve has been changed from open to totally closed), the process proceeds to step S103, and "1" is assigned to the throttle open/close flag. If the determination result in step S102 is "NO" (i.e., the state of the throttle valve has not been changed from open to totally closed), the process proceeds to step S114. The processes after step S114 will be explained later in detail.

After executing the step S103, the process proceeds to step S104, and the revolution rate N1 of the transmission's input shaft is read from the output signal of the transmission revolution rate sensor 28. Then, the process proceeds to step S105, and the revolution rate N2 of the motor generator is read from the output signal of the engine rotation number sensor 26.

Then, the process proceeds to step S106, and calculates the absolute value $\Delta N$ of the difference between the revolution rate N1 of the transmission's input shaft and the revolution rate N2 of the motor generator.

After this, the process proceeds to step S107, and it is determined whether or not the absolute value $\Delta N$ of the difference in revolution rate calculated in step S106 is larger than a predetermined value.

If the determination result in step S107 is "YES" (i.e., $\Delta N$>predetermined value), it is determined that the revolution rate N1 of the transmission's input shaft and the revolution rate N2 of the motor generator are not synchronized, and the process proceeds to step S108 to assign "1" to the synchronization flag. Then, the process proceeds to step S109 to carry out the operation for controlling the revolution rate of the motor generator 3. The operation for controlling the revolution rate of the motor generator 3 is carried out by controlling the revolution rate of the motor generator 3 using the revolution rate N1 of the transmission's input shaft as a target value.

After the operation for controlling the revolution rate of the motor generator 3 is performed in step S109, the process proceeds to step S110 to assign "0" to the regeneration allowance flag, and the execution of the main routine is temporary terminated. Accordingly, the regenerative operation is not allowed when the operation for controlling the revolution rate of the motor generator 3 is performed.

When the routine is performed next time, since the throttle open/close flag is "1", the determination result in step S101 will be "NO". Accordingly, the process proceeds to step S104.

If the determination result in step S107 is "NO" (i.e., $\Delta N \leq$ predetermined value), since it is determined that the revolution rate N1 of the transmission's input shaft and the revolution rate N2 of the motor generator are almost synchronized, the process proceeds to step S111 to assign "0" to the synchronization flag, and the operation for controlling the revolution rate of the motor generator 3 is completed. Then, the process proceeds to step S112 to assign "1" to the regeneration allowance flag. After this, the process proceeds to step S113 to assign "0" to the throttle open/close flag, and the execution of the main routine is temporary terminated.

After the revolution rate N1 of the transmission's input shaft and the revolution rate N2 of the motor generator are synchronized as explained above, when the routine is carried out the next time, the determination result in step S101 will be "YES" since "0" has been assigned to the throttle open/close flag from the previous execution. Accordingly, the process proceeds to step S102.

If the determination result in step S102 is "NO" (i.e., the state of the throttle valve has not been changed from open to totally closed), the process proceeds to step S114, and it is determined whether or not the throttle valve is completely closed.

If the determination result in step S104 is "YES" (i.e., the throttle valve is completely closed), the process proceeds to step S105, and it is determined whether or not the transmission 6 is changing the gear.

If the gear change flag is "1", it is determined that the transmission 6 is changing the gear, and if the gear change flag is "0", it is determined that the transmission 6 is not changing the gear.

If the determination result in step S115 is "NO" (i.e., the gear is not changing), the process proceeds to step S116, and "0" is assigned to the synchronization flag. Then, the process proceeds to step S117, and "1" is assigned to the regeneration allowance flag. After this, the execution of the main routine is temporary terminated. That is, in the time chart shown in FIG. 5, regeneration allowance is maintained if no gear change operation is performed after time "c" (i.e., between time c and d), and the regenerative braking may be carried out with an engaged state of the lock-up clutch 4.

On the other hand, if the determination result in step S115 is "YES" (i.e., the gear is changing), the process proceeds to step S118, and the revolution rate N1 of the transmission's input shaft is read from an output signal supplied from the transmission revolution rate sensor 28. Then, the process proceeds to step S119 to read the revolution rate N2 of the motor generator from an output signal of the engine revolution rate sensor 26.

After this, the process proceeds to step S120, and the absolute value ΔN of the difference between the revolution rate N1 of the transmission's input shaft and the revolution rate N2 of the motor generator is calculated.

Then, the process proceeds to step S121, and it is determined whether or not the absolute value ΔN of the difference in revolution rate calculated in step S120 is larger than a predetermined value.

If the determination result in step S121 is "YES" (i.e., ΔN>predetermined value), it is determined that the revolution rate N1 of the transmission's input shaft and the revolution rate N2 of the motor generator are not synchronized, and the process proceeds to step S122 to assign "1" to the synchronization flag. Then, the process proceeds to step S123 to carry out the operation for controlling the revolution rate of the motor generator 3. The operation for controlling the revolution rate of the motor generator 3 is carried out by controlling the revolution rate of the motor generator 3 using the revolution rate N1 of the transmission's input shaft as a target value.

After the operation for controlling the revolution rate of the motor generator 3 is performed in step S123, the process proceeds to step S124 to assign "0" to the regeneration allowance flag, and the execution of the main routine is temporary terminated. Accordingly, the regenerative operation is not allowed when the operation for controlling the revolution rate of the motor generator 3 is performed (i.e., during the time period between "d" and "f").

If the determination result in step S120 is "NO" (i.e., ΔN≦predetermined value), since it is determined that the revolution rate N1 of the transmission's input shaft and the revolution rate N2 of the motor generator are almost synchronized, the process proceeds to step S116 to assign "0" to the synchronization flag, and the operation for controlling the revolution rate of the motor generator 3 is completed. Then, the process proceeds to step S117 to assign "1" to the regeneration allowance flag, and the execution of the main routine is temporary terminated.

That is, in the time chart shown in FIG. 5, if the transmission 6 is downshifted at time "d", regenerative operation is not allowed during the period of changing the gear (i.e., time period between "d" and "e") and the operation for controlling the revolution rate of the motor generator 3 (i.e., time period between "d" and "f"), and hence, the regeneration is discontinued. When the operation for controlling the revolution rate of the motor generator 3 is completed, the regeneration process is allowed to resume and the regenerative braking is carried out again with an engaged state of the lock-up clutch 4.

Also, if the determination result in step S114 is "NO" (i.e., the throttle valve is open), the process proceeds to step S125, and "0" is assigned to the synchronization flag. Then, the process proceeds to step S126, and "0" is assigned to the regeneration allowance flag. After this, execution of the main routine is temporary terminated. That is, when the running state of the hybrid vehicle 1 changes from the deceleration mode to the acceleration mode, regeneration is not allowed, and the regenerative operation by the motor generator 3 is terminated.

Note that although it is not indicated in the time chart shown in FIG. 5, if the lock-up clutch 4 is in the engaged state just before the completely closing operation for the throttle valve, and if the L/C engaging flag is "1", the lock-up clutch 4 is controlled so as to maintain the engaged state thereof by the oil hydraulic circuit 13 based on a command from the ECU 13 when the throttle is completely closed.

In the above-mentioned case, however, since the upshifting operation of the transmission 6 is carried out for the purpose of increasing the regenerative energy associated with the completely closing operation of the throttle valve, the lock-up clutch 4 is entered into its non-engaged state while changing the gear so that no shock is generated. When the lock-up clutch 4 is reengaged after the completion of the gear changing process, the revolution rate N2 of the motor generator 3 is synchronized with the revolution rate N1 of the transmission's input shaft 10 by controlling the revolution rate of the motor generator 3, if the revolution rate N2 of the motor generator 3 is not synchronized with the revolution rate N1 of the transmission's input shaft 10, in order to engage the lock-up clutch 4.

Note that in this embodiment, the regeneration allowance determination unit, which determines allowance or non-allowance of the regenerative operation by the motor, is realized by carrying out the process in step S100. Also the lock-up clutch revolution rate synchronization determination unit, which determines the synchronization of the revolution rate of the motor and the revolution rate of the input shaft of the transmission is realized by carrying out the process in step S107. Moreover, the motor control unit, which actuates the motor using the revolution rate as a target value, is realized by carrying out the process in step S109.

Note that in the above-mentioned embodiment, if the upshifting operation is carried out in association with the operation for completely closing the open valve, the lock-up clutch 4 is controlled to be non-engaged state during the gear change operation, and the control for the revolution rate of the motor generator 3 is continued even if the lock-up clutch 4 is in the engaged state after the completion of the gear change operation. However, if the lock-up clutch 4 has been engaged at the time of completion of the gear change operation, it is possible to terminate the operation for controlling the revolution rate of the motor generator 3 since it is not necessary to continue the operation for controlling the revolution rate of the motor generator 3. In this manner, it becomes possible to reduce the energy consumed by the operation for controlling the revolution rate of the motor generator 3.

Figure 6:
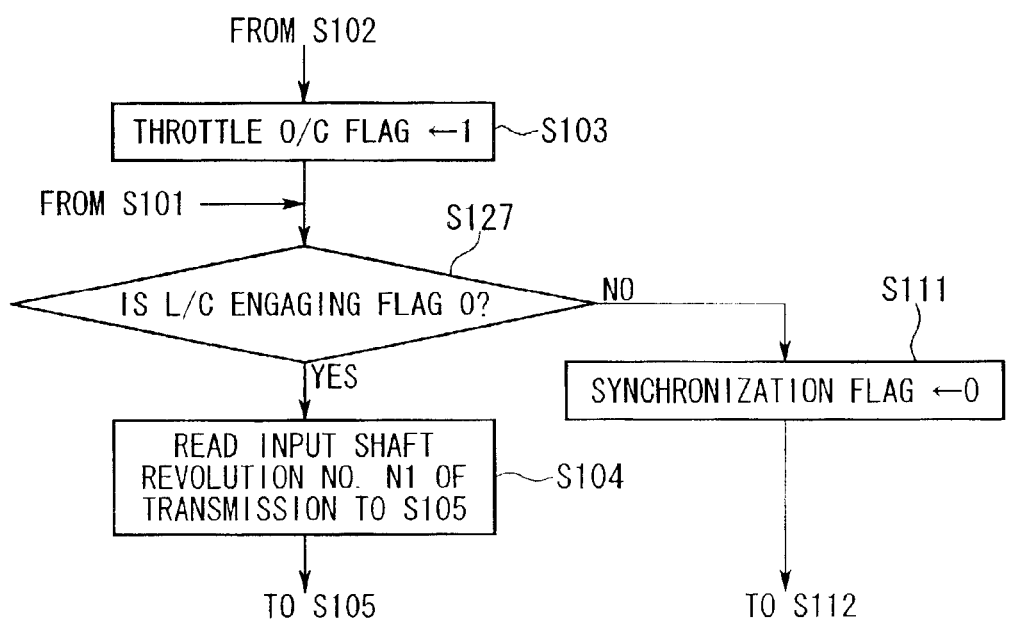
FIG. 6 is a part of a flowchart of a regeneration allowance determination process used in another embodiment of the present invention.

FIG. 6 is a flowchart for explaining the above-mentioned case. In the flowchart shown in FIG. 6, the process proceeds to step S127 after executing step S103, and it is determined whether or not the L/C engaging flag is "0". If the determination result in step S127 is "YES" (i.e., the L/C engaging flag is "0", the process proceeds to step S104 since the lock-up clutch 4 is not engaged. If the determination result is "NO" in step S127, on the other hand, the process proceeds to step S111 since the lock-up clutch 4 has been engaged and it is not necessary for carrying out the operation for controlling the revolution rate of the motor generator 3.

The same procedure as explained above may be carried out when the gear changing operation is carried out during a deceleration running mode of the vehicle in which the throttle valve is maintained to be in a completely closed state. Accordingly, it is possible to terminate the operation for controlling the revolution rate of the motor generator 3 when the lock-up clutch 4 is engaged at the completion of the gear changing operation.

Also, although it is determined whether the revolution rate N1 of the transmission's input shaft and the revolution rate N2 of the motor generator 3 are synchronized based on the difference ΔN between the revolution rate N1 of the transmission's input, which is detected by the transmission revolution rate sensor 28, and the revolution rate N2 of the motor generator, which is detected by the engine revolution rate sensor 26, in the above-mentioned embodiment, it is possible to determine whether the revolution rate N1 of the transmission's input shaft and the revolution rate N2 of the motor generator 3 are synchronized by calculating the ratio of the revolution rate N1 of the transmission's input shaft to the revolution rate N2 of the motor generator, and determining whether the calculated value of the ratio is within a predetermined range.

Moreover, instead of determining the synchronization based on the value (i.e., the difference in revolution rate or the ratio of revolution rate) of comparing the revolution rate N1 of the transmission's input shaft with the revolution rate N2 of the motor generator, it is possible to determine whether the revolution rate N1 of the transmission's input shaft and the revolution rate N2 of the motor generator are synchronized based on the fact that a predetermined time has been elapsed since the start of the operation for controlling the revolution rate of the motor generator 3. In this case, it is determined that the synchronization is achieved when the predetermined time has been elapsed, and it is determined that synchronization is not achieved if the predetermined time has not elapsed. In this manner, it becomes possible to avoid a lengthy operation for controlling the revolution rate of the motor generator 3, and an increase in the energy consumption associated with the control operation for the revolution rate my be suppressed. Note that in the above case, the lock-up clutch revolution rate synchronization determination unit is realized by a counting process for the elapsed time.

The present invention is not limited to the above-mentioned embodiments by any means.

For example, although a non-continuous variable transmission including a gear train is used as a transmission in the above-explained embodiments, it is possible to use a continuously variable transmission including a belt, pulley, etc.

As explained above, since the hybrid vehicle according to the embodiment of the present invention, which includes an engine and a motor capable of generating power as a source of power, in which power from at least one of the engine and the motor is transmitted to an output shaft via a torque converter provided with a lock-up clutch and a transmission to be used as a driving force for the vehicle, and a force input through wheels during a deceleration mode of the vehicle is transmitted to the motor via the torque converter and the transmission so that a regenerative operation is carried out by the motor to convert deceleration energy into regenerative energy, comprises a throttle opening degree detection unit which detects an opening degree of the throttle; a lock-up clutch engaging state determination unit which determines an engaged state of the lock-up clutch; and a lock-up clutch engagement control unit which controls an engagement and non-engagement of the lock-up clutch, wherein the lock-up clutch engagement control unit, if the throttle opening degree detection unit detects a completely closing state of the throttle, controls the lock-up clutch so as to be engaged regardless of an engaged state of the lock-up clutch determined by the lock-up clutch engaging state determination unit, it becomes possible, when a regenerative operation is carried out by the motor during deceleration of the vehicle, to perform the regenerative operation with an engaged state of the lock-up clutch from the initial stage of deceleration. Accordingly, restriction in the regenerative torque associated with having a torque converter may be eliminated, and as a result, the deceleration energy may be efficiently converted into a regenerative energy so that hybrid running region may be increased and energy consumption may be reduced.

Also, since the hybrid vehicle according to another embodiment of the present invention includes a transmission input shaft revolution rate detection unit which detects a revolution rate of an input shaft of the transmission; a motor revolution rate detection unit which detects a revolution rate of the motor; and a motor control unit which drives the motor based on a revolution rate as a target value, wherein the motor control unit, when the throttle opening degree detection unit detects a completely closed state of the throttle, carries out a synchronizing control in which the revolution rate of the motor is controlled so as to synchronize with the revolution rate of the input shaft of the transmission, which is detected by the transmission input shaft revolution rate detection unit, it becomes possible to firmly engage the lock-up clutch which is in a non-engagement state.

Moreover, since the hybrid vehicle according to yet another embodiment of the present invention includes the-lock-up clutch revolution rate synchronization determination unit which determines synchronization of the revolution rate of the motor with the revolution rate of the input shaft of the transmission, wherein the motor control unit terminates the synchronizing control when it is determined by the lock-up clutch revolution rate synchronization determination unit that synchronization is achieved, it becomes possible to terminate the synchronizing control by the motor control unit when it is determined by the lock-up clutch revolution rate synchronization determination unit that the revolution rate of the motor and the revolution rate of the input shaft of the transmission are synchronized. Accordingly, it becomes possible to reduce energy consumption associated with the synchronizing control.

Furthermore, since the hybrid vehicle according to yet another embodiment of the present invention includes the lock-up clutch revolution rate synchronization determination unit which determines whether or not synchronization is achieved based on whether a value satisfies a predetermined condition, the value being obtained by comparing the revolution rate of the input shaft of the transmission, which is detected by the transmission input shaft revolution rate detection unit, with the revolution rate of the motor, which is detected by the motor revolution rate detection unit, it becomes possible to assuredly determine whether the revolution rate of the motor and the revolution rate of the input shaft of the transmission are synchronized.

In addition, since the hybrid vehicle according to yet another embodiment of the present invention includes the lock-up clutch revolution rate synchronization determination unit which determines that synchronization is achieved when a predetermined time has been elapsed since the synchronizing control by the motor control unit is started, it becomes possible to avoid a needlessly lengthy synchronizing control by the motor control unit, and hence, increase in the energy consumption associated with the synchronizing control may be prevented.

Also, since the hybrid vehicle according to yet another embodiment of the present invention includes the regeneration allowance determination unit which determines allowance and non-allowance of the regenerative operation by the motor, wherein the regeneration allowance determination unit allows the regenerative operation when it is determined by the lock-up clutch revolution rate synchronization determination unit that synchronization is achieved, it becomes possible to quickly carry out a regenerative operation after it is determined by the lock-up clutch revolution rate synchronization determination unit that the revolution rate of the motor and the revolution rate of the input shaft of the transmission are synchronized. Accordingly, loss in regenerative energy may be reduced.

Furthermore, since the hybrid vehicle according to yet another embodiment of the present invention includes the motor control unit which, when the throttle opening degree detection unit detects a completely closed state of the throttle, terminates the synchronizing control if the lock-up clutch engaging state determination unit determines that the lock-up clutch is engaged, it becomes possible to prevent increase in the energy consumption associated with the synchronizing control.

Having thus described an exemplary embodiment of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only: the invention is limited and defined only by the following claims and equivalents thereto.

What is claimed is:

1. A hybrid vehicle including an engine and a motor capable of generating power as a source of power, in which power from at least one of said engine and said motor is transmitted to an output shaft via a torque converter provided with a lock-up clutch and a transmission to be used as a driving force for the vehicle, and a force input through wheels during a deceleration mode of the vehicle is transmitted to said motor via said torque converter and said transmission so that a regenerative operation is carried out by said motor to convert deceleration energy into regenerative energy, said hybrid vehicle comprising:

a throttle opening degree detection unit which detects an opening degree of said throttle; a lock-up clutch engaging state determination unit which determines a an engaged state of said lock-up clutch;

a lock-up clutch engagement control unit which controls an engagement and non-engagement of said lock-up clutch;

a transmission input shaft revolution rate detection unit which detects a revolution rate of an input shaft of said transmission;

a motor revolution rate detection unit which detects a revolution rate of said motor; and a motor control unit which drives said motor based on a revolution rate as a target value, wherein, when said throttle opening degree detection unit detects a completely closed state of said throttle, said motor control unit carries out a synchronizing control in which the revolution rate of said motor is controlled so as to be synchronized with the revolution rate of said input shaft of said transmission, which is detected by said transmission input shaft revolution rate detection unit, and said lock-up clutch engagement control unit controls said lock-up clutch so as to be engaged regardless of an engaged state of said lock-up clutch determined by said lock-up clutch engaging state determination unit.

2. A hybrid vehicle according to claim 1, wherein said lock-up clutch engagement control unit controls said lock-up clutch so as to be engaged if said lock-up clutch engaging state determination unit determines that said lock-up clutch is in a non-engagement state.

3. A hybrid vehicle according to claim 1, further comprising:

a lock-up clutch revolution rate synchronization determination unit which determines synchronization of the revolution rate of said motor with the revolution rate of said input shaft of said transmission, wherein said motor control unit terminates the synchronizing control when it is determined by said lock-up clutch revolution rate synchronization determination unit that synchronization is achieved.

4. A hybrid vehicle according to claim 3, wherein said lock-up clutch revolution rate synchronization determination unit determines whether or not synchronization is achieved based on whether a value satisfies a predetermined condition, said value being obtained by comparing the revolution rate of the input shaft of the transmission, which is detected by said transmission input shaft revolution rate detection unit, with the revolution rate of said motor, which is detected by said motor revolution rate detection unit.

5. A hybrid vehicle according to claim 3, wherein said lock-up clutch revolution rate synchronization determination unit determines that synchronization is achieved when a predetermined time period has elapsed since a start of the synchronizing control by said motor control unit.

6. A hybrid vehicle according to claim 3, further comprising:

a regeneration allowance determination unit which determines allowance and non-allowance of the regenerative operation by said motor, wherein said regeneration allowance determination unit allows the regenerative operation when it is determined by said lock-up clutch revolution rate synchronization determination unit that synchronization is achieved.

7. A hybrid vehicle according to claim 4, further comprising:

a regeneration allowance determination unit which determines allowance and non-allowance of the regenerative operation by said motor, wherein said regeneration allowance determination unit allows the regenerative operation when it is determined by said lock-up clutch revolution rate synchronization determination unit that synchronization is achieved.

8. A hybrid vehicle according to claim 5, further comprising:

a regeneration allowance determination unit which determines allowance and non-allowance of the regenerative operation by said motor, wherein said regeneration allowance determination unit allows the regenerative operation when it is determined by said lock-up clutch revolution rate synchronization determination unit that synchronization is achieved.

9. A hybrid vehicle according to claim 1, wherein when said throttle opening degree detection unit detects a completely closed state of said throttle, said motor control unit terminates the synchronizing control if said lock-up clutch engaging state determination unit determines that said lock-up clutch is engaged.

* * * * *